G. J. MILLER.
ANIMAL TRAP.
APPLICATION FILED NOV. 25, 1908.
928,779.
Patented July 20, 1909.
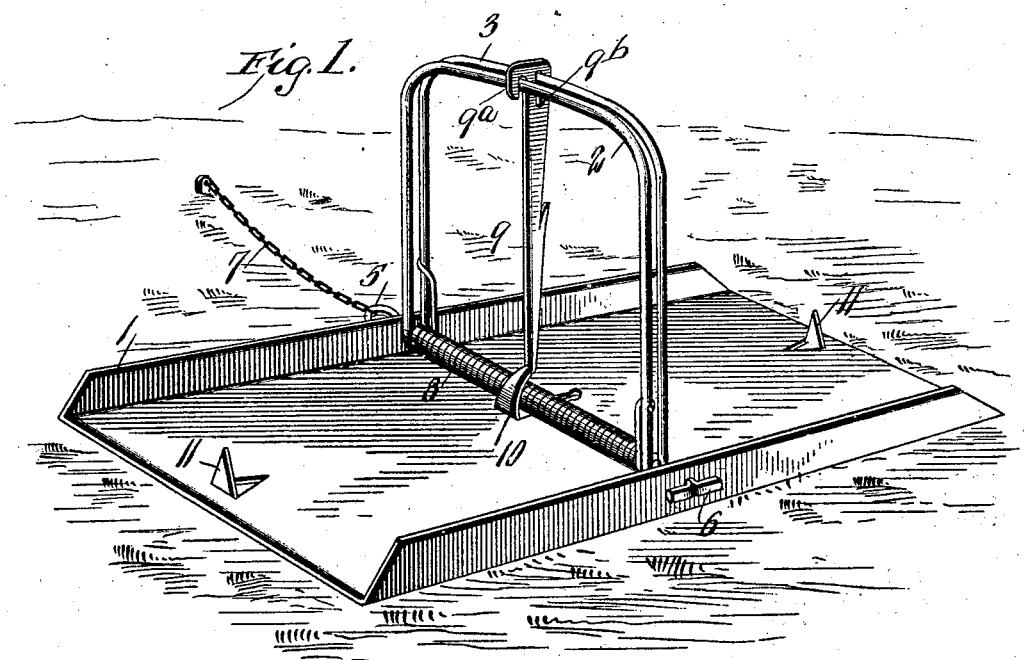
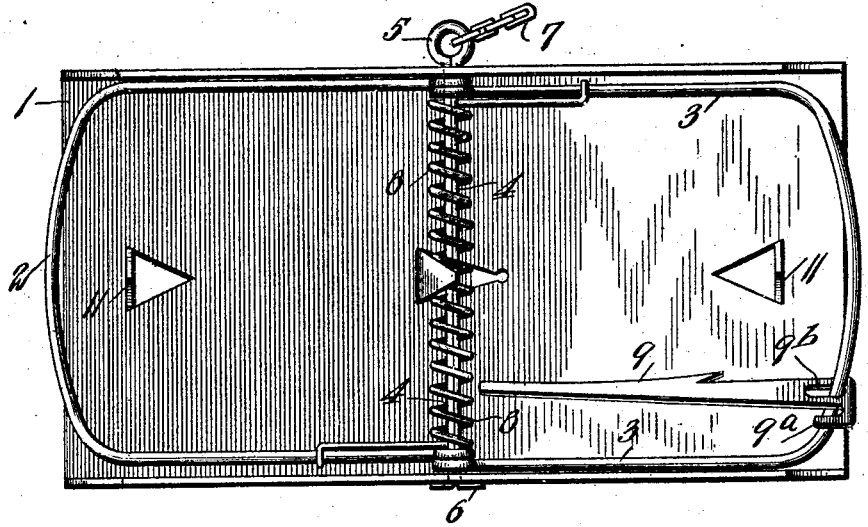
WITNESSES
E. M. Callaghan
Amos W. Hart
INVENTOR
George J. Miller
BY Munn & Co.
ATTORNEYS

UNITED STATES PATENT OFFICE.

GEORGE JOSEPH MILLER, OF MARCO, MONTANA.

ANIMAL-TRAP.

No. 928,779.     Specification of Letters Patent.     Patented July 20, 1909.

Application filed November 25, 1908. Serial No. 464,347.

*To all whom it may concern:*

Be it known that I, GEORGE JOSEPH MILLER, a citizen of the United States, residing at Marco, Dawson county, State of Montana, have invented an Improvement in Animal-Traps, of which the following is a specification.

My present invention is an improvement upon the spring-jaw animal-trap for which I have received Letters-Patent of the United States, No. 809,203, dated January 2, 1906.

The improvement is embodied in certain features whereby the efficiency of the trap is increased and its cost of manufacture reduced.

The details of construction, combination, and operation of parts are as hereinafter described and illustrated in the accompanying drawing, in which—

Figure 1 is a perspective view of the trap with the spring jaws arranged and locked as when the trap is set for use. Fig. 2 is a plan view of the trap in the sprung or unset condition.

The body 1 of the trap is formed of a thin iron or steel plate, the same having narrow vertical side flanges. Bow-shape spring jaws, 2 and 3, are attached at their inner ends to a cross-bolt 4, which passes through the side flanges at a point midway of their length. The said jaws are preferably formed of stout wire and their inner ends are coiled about the pivot 4. In place of forming the latter U-shape as in the invention covered by my aforesaid patent, I make it in the form of a cotter-pin, the same having an eye 5 at one end and the opposite ends 6 being turned outward to prevent withdrawal of the bolt. An anchoring chain 7 is attached to the eye, as shown.

A spiral spring 8 is coiled about the cotter-pin and its ends engage the opposite jaws 2 and 3, as will be understood from the drawing. The spring is under tension and holds the jaws pressed flat upon the body 1 of the trap. By employing a single jaw-pivot 4, and a single spring applied thereto, as shown, I reduce the cost and weight of the trap to an essential degree. When the jaws are raised to the vertical position as required to set the trap, it is of course against the tension of the spring. The jaws are locked in this position, shown in Fig. 1, by means of a trigger 9, which serves also as a bait-holder. The same is formed of a tapered metal plate having a hook 9ª and an adjacent lengthwise slot 9ᵇ. The hook 9ª engages the jaw 2 and the jaw 3 passes through the slot. The tendency of the jaws to separate from each other under the tension of the spring 8 requires that the lower end of the tripper 9 shall be held from movement to the left or in the direction indicated by the arrow Fig. 1. I, therefore, provide a stop 10 with which the trigger is in contact when the jaws are set, as shown in Fig. 1. This stop is formed by cutting out a tongue from the body 1 of the trap, *i. e.* by slitting a portion of the body at a central point and then bending the same upward and backward into the position indicated.

It is obvious that a mouse, rat, or other animal nibbling at the bait held on the trigger 9, will disengage the latter from the stop 10, and thus instantly spring the trap. In such case, the trigger slides upward, since the hook slips off the jaw 2, while the slot 9ᵇ permits the jaw 3 free movement therein.

In my former invention, the trigger was connected with the jaw by means of a ring, but I have found the slot 9ᵇ a preferable substitute, not only as regards operation of the trap, but for reducing the cost of manufacture.

When the jaws are sprung, and the animal is caught beneath one or the other, if not instantly killed or disabled, he naturally seeks to escape by crawling out under the jaw; and to prevent the possibility of escape in this manner, I provide each end of the body 1 with a fang 11 which is formed by slitting the body at an angle and bending upward the triangular tongue thus formed. These fangs will ordinarily pierce the skin or body of the animal when the trap is sprung, so that he is prevented from movement in any direction.

What I claim is:

1. The combination, with the body of a trap, having vertical side flanges, and a stop 10 arranged centrally, and a transverse shaft journaled in said flanges, of jaws pivoted on the shaft, and a spring coiled about the shaft and jaws as described, a trigger consisting of a metal plate having at one end a closed lengthwise slot through which one of the jaws passes, and provided adjacent to said slot with a hook for engaging the other jaw, as shown and described.

2. The combination of spring-actuated jaws and a trigger connected therewith in the manner described, with a body having a stop 10 formed integrally therewith and projecting upward from the middle of the body, as shown and described.

GEORGE JOSEPH MILLER.

Witnesses:
C. T. WILKINSON,
GEO. J. THIESSEN.